Patented Nov. 23, 1948

2,454,676

UNITED STATES PATENT OFFICE 2,454,676

ADHESIVE COMPOSITIONS

Norman A. Skow, Strafford, Pa., and Charles J. Seiler, Bloomfield, Richard A. Oriani, Montclair, and Joseph S. Whitaker, East Orange, N. J., assignors to the United States of America as represented by the Secretary of War No Drawing. Application August 29, 1945, Serial No. 613,448

3 Claims. (Cl. 106—240)

This invention relates to adhesive compositions and has particular reference to adhesives which may be used to attach objects to various surfaces under a wide variety of conditions.

In accordance with this invention, an adhesive has been prepared which is capable of supporting substantial loads on a variety of surfaces for a long period of time from the instant of application. The adhesive of this invention may be prepared from readily available materials and it has a good storage life. In addition, the adhesive of this invention will function within a wide temperature range on rough, wet, oily or dirty surfaces.

It is an object of this invention to provide an adhesive which is capable of adhering to a variety of materials within a wide temperature range regardless of the condition of the surfaces thereof. Another object of this invention is to provide an adhesive capable of adhering to surfaces immediately upon application and of supporting substantial loads for a long period of time from the instant of application. Still another object of this invention is to provide an adhesive which may be stored for long periods of time without deterioration. A further object of this invention is to provide an adhesive, the consistency of which does not vary materially over a wide temperature range. A still further object of this invention is to provide an adhesive comprising a tackifying agent, a plasticizer, a filler and a hygroscopic material. Further and additional objects will appear from the following description and the appended claims.

The foregoing objects are accomplished by this invention which, briefly stated, constitutes preparing an adhesive comprising substantial proportions of a tackifying agent, a plasticizer having a low vapor pressure and a substantially uniform viscosity over a wide temperature range, mineral fillers, and, optionally, a hygroscopic solid material. An adhesive of this character, when properly prepared, will support a considerable load on a vertical surface from the instant of application. It may be packaged in a convenient form and will function on rough, wet, oily or dirty surfaces.

The tackifying agents that have been found particularly suitable for use in the preparation of the adhesive of this invention are ester gum, rosin, limed rosin, and the corresponding hydrogenated products, as well as many wholly synthetic rosins. It is preferred to use materials in the adhesive which are not susceptible to rapid ageing. It has been found that limed rosin is to be preferred since it is not susceptible to ageing in the adhesive. For example, a good commercial grade of limed rosin having a melting point (ring and ball method) of 270° F. ±10°, an acid number of 75±5, and a per cent $Ca(OH)_2$ of 5.6±0.3 is satisfactory.

Any plasticizer for the tackifying agent may be employed which has the characteristics indicated above. Those that have been found to be particularly desirable are triethylene glycol di-2-ethylbutyrate and triethylene glycol di-2-ethylhexoate. Other plasticizers such as castor oil, tricresyl phosphate and turpentine may also be used. These last mentioned plasticizers, however, are not entirely satisfactory because they do not provide a composition having a sufficiently uniform viscosity over a wide temperature range.

The mineral fillers may comprise asbestos or glass or mineral wool fibers. Asbestos fibers having been found to be very satisfactory for the purpose. The mineral fillers impart sheer resisting properties to the adhesive.

In order to provide an adhesive which will readily adhere to damp or wet surfaces it has been found desirable to incorporate a substantial proportion of a hygroscopic solid material therewith. Such a hygroscopic material may be a water-swellable clay such as bentonite. The bentonite serves to absorb the water film on the surface and allows sticking of the adhesive instantaneously upon application without an undue amount of force.

For a more complete understanding of this invention several specific examples are here given. It will be recognized, however, that this invention is not to be strictly limited to the specific ingredients and precise proportions indicated in these examples.

Example I

An adhesive was prepared having the following composition in parts by weight:

| | |
|---|---|
| Limed rosin | 29.6 |
| Triethylene glycol di-2-ethylbutyrate | 28.4 |
| Ground asbestos | 42.0 |

The limed rosin employed has a melting point of 282° F. and an acid number of 75. The percentage of calcium, expressed as calcium hydroxide, was 5.6%. The ground asbestos had the following particle size: above 20 mesh, 5%; 20–40 mesh, 23%; 40–60 mesh, 31%; below 60 mesh, 41%.

The adhesive was prepared by charging the plasticizer into a kneader, equipped for heating and cooling, which was heated to 330–360° F.

The limed rosin was added and the kneader heated until the limed rosin was completely dissolved. While still hot, the asbestos was added and mixed for five minutes. The mixture was then cooled and the mixing continued for three hours.

The adhesive prepared as above has an oily appearance at 70° F. and, when properly prepared, will support a minimum of 80 grams per square inch on a minimum contact area of three square inches between vertical sanded steel plates at 125° F. for at least 4½ hours.

In order to produce an adhesive having the proper workability it should not be too stiff to apply easily. The adhesive prepared in accordance with this example should not support a load in excess of 110 grams per square inch at 125° F. between three square inches of vertical sanded steel surfaces. Also, the adhesive should not support a load in excess of 225 grams per square inch for more than thirty minutes between the same surfaces at 70° F.

It is important that the adhesive pass both the adhesive strength test and the workability test, above referred to. If the adhesive is too strong it will be too stiff to apply easily and it may be processed further by additional grinding and mixing. This additional grinding should be done with care and with frequent rechecking of strength and workability to obtain an adhesive having the desired characteristics.

*Example II*

An adhesive was prepared having the following composition in parts by weight:

| | |
|---|---|
| Limed rosin | 22.6 |
| Triethylene glycol di-2-ethylbutyrate | 35.4 |
| Ground asbestos | 42.0 |

The several ingredients of the adhesive are mixed together in the manner indicated in connection with Example I. This adhesive should have an oily appearance at 70° F. and should support a minimum of 80 grams per square inch on a minimum contact area of three square inches between vertical sanded steel surfaces at 80° F. for at least 4½ hours.

With respect to workability, this adhesive should not support a load in excess of 110 grams per square inch for more than fifteen minutes between vertical sanded steel surfaces at 80° F. Also, the adhesive should not support between the same surfaces a load in excess of 225 grams per square inch for more than thirty minutes at 30° F.

*Example III*

An adhesive having the following composition in parts by weight was prepared by the process indicated in Example I:

| | |
|---|---|
| Limed rosin | 24.7 |
| Triethylene glycol di-2-ethylbutyrate | 30.2 |
| Ground asbestos | 35.1 |

This adhesive should have an oily appearance at 70° F. and should support a minimum of 80 grams per square inch on a minimum contact area of three square inches between vertical sanded steel surfaces at 125° F. for at least 4½ hours.

With respect to workability, this adhesive should not support a load in excess of 110 grams per square inch for more than fifteen minutes between vertical sanded surfaces at 125° F. Also, it should not support a load in excess of 225 grams per square inch at 70° F. for more than thirty minutes.

*Example IV*

An adhesive was prepared in accordance with the process indicated in Example I having the following composition in parts by weight:

| | |
|---|---|
| Limed rosin | 31.9 |
| Triethylene glycol di-2-ethylbutyrate | 30.1 |
| Ground asbestos | 9.5 |
| Bentonite | 28.5 |

The bentonite and asbestos are added to the charge of limed rosin and plasticizer in the kneader while hot. The kneading is continued for about thirty minutes after the temperature of the mix has fallen to about 80° F.

This adhesive should have a smooth, uniform texture and at 70° F. it is oily in appearance. The adhesive should support a minimum load of 80 grams per square inch on a minimum contact area of three square inches between vertical sanded steel surfaces at 125° F. for at least 4½ hours. With respect to workability, the adhesive should fail in cohesion between vertical sanded steel surfaces at a load of 140 grams per square inch at 125° F. in less than fifteen minutes. Failure should also occur at a load of 220 grams per square inch at 75° F. in less than thirty minutes.

*Example V*

An adhesive was prepared using ester gum in place of limed rosin and having the following composition in parts by weight:

| | |
|---|---|
| Ester gum | 29.2 |
| Triethylene glycol di-2-ethylbutyrate | 28.8 |
| Ground asbestos | 42.0 |

*Example VI*

An adhesive was prepared using rosin in place of limed rosin and having the following composition in parts by weight:

| | |
|---|---|
| Rosin | 31.6 |
| Triethylene glycol di-2-ethylbutyrate | 27.4 |
| Ground asbestos | 41.0 |

*Example VII*

An adhesive was also prepared using hydrogenated rosin in place of limed rosin and having the following composition in parts by weight:

| | |
|---|---|
| Hydrogenated rosin | 31.6 |
| Triethylene glycol di-2-ethylbutyrate | 27.4 |
| Ground asbestos | 41.0 |

The kneader specified in the foregoing examples may be any one commercially available that is satisfactory for preparing compositions of this type. One equipped with Sigma type blades may be preferable. However, other types of mixers and kneaders may be used. Mixing rolls have been found to be entirely satisfactory.

In the utilization of the adhesive of this invention the first operation consists of applying a layer of adhesive ⅛ to ¼ inch thickness to the face of the object to be attached to the desired surface. For large areas (20 square inches or larger) it may be advisable to loosen the surface of the adhesive by deep scratches. The second operation consists of bonding the object to the desired surface. This is accomplished by pushing the object against the surface and rotating it in a circle with a diameter of about ½ inch. The purpose of this rotating motion is to work the adhesive into the surface. This may be important if the surface is contaminated with water, oil or dirt. However, if the adhesive contains bentonite or other solid hygroscopic material, as suggested in Example IV, it may not be necessary to rotate the object in this manner in order to obtain the desired bond. Also, the hygroscopic substance permits the adhesive to be very effectively utilized even though substantial amounts of water are present on the surface.

While several specific examples have been given showing certain preferred modifications on this invention, it will, of course, be recognized that the invention is not to be limited thereto and it is intended therefore that the invention be restricted only by the spirit and scope of the appended claims.

Having thus described our invention what we claim is new and wish to secure by Letters Patent is:

1. A slow aging adhesive capable of attachment to wet and oily surfaces and of supporting substantial loads for an extended period of time from the instant of application, said adhesive consisting of the following ingredients substantially in the proportions specified, limed rosin 31.9%, triethyleneglycol di-2-ethylbutyrate 30.1%, ground asbestos 9.5% and bentonite 28.5%.

2. A slow-aging adhesive capable of attachment to wet and oily surfaces and of supporting substantial loads for an extended period of time from the instant of application, which adhesive consists of the following ingredients in substantially the proportions indicated, limed rosin from approximately 22.6 percent to approximately 29.6 percent, triethyleneglycol di-2-ethylbutyrate from approximately 28.4 percent to approximately 35.4 percent, and asbestos from approximately 35.1 percent to appromixately 42 percent.

3. A slow-aging adhesive capable of attachment to wet and oily surfaces and of supporting substantial loads for an extended period of time from the instant of application, which adhesive consists of the following ingredients in the proportions indicated, ester gum approximately 29.2 percent, triethyleneglycol di-2-ethylbutyrate approximately 28.8 percent, and ground asbestos approximately 42 percent.

NORMAN A. SKOW.
CHARLES J. SEILER.
RICHARD A. ORIANI.
JOSEPH S. WHITAKER.

REFERENCES CITED

The following references are of record in the file of this patent:

UNITED STATES PATENTS

| Number | Name | Date |
|---|---|---|
| 2,229,222 | Reid | Jan. 21, 1941 |
| 2,217,988 | Lawson | Oct. 15, 1940 |
| 1,919,454 | Ware | July 25, 1933 |
| 1,772,457 | Currie | Aug. 12, 1930 |
| 1,498,269 | Harris | June 17, 1924 |